US012316223B2

United States Patent
Nicholson et al.

(10) Patent No.: US 12,316,223 B2
(45) Date of Patent: May 27, 2025

(54) PHASE MULTIPLEXED SERIES STACKED DC-DC CONVERTER

(71) Applicant: Empower Semiconductor, Inc., San Jose, CA (US)

(72) Inventors: Richard Nicholson, Aptos, CA (US); Timothy Alan Phillips, Hope, RI (US)

(73) Assignee: Empower Semiconductor, Inc., San Jose, CA (US)

( * ) Notice: Subject to any disclaimer, the term of this patent is extended or adjusted under 35 U.S.C. 154(b) by 210 days.

(21) Appl. No.: 18/066,911

(22) Filed: Dec. 15, 2022

(65) Prior Publication Data
US 2023/0198406 A1   Jun. 22, 2023

Related U.S. Application Data

(60) Provisional application No. 63/265,823, filed on Dec. 21, 2021, provisional application No. 63/265,611, filed on Dec. 17, 2021.

(51) Int. Cl.
*H02M 3/158* (2006.01)
*H02M 1/00* (2006.01)

(52) U.S. Cl.
CPC ......... *H02M 3/158* (2013.01); *H02M 1/0074* (2021.05); *H02M 1/0009* (2021.05); *H02M 3/1582* (2013.01); *H02M 3/1584* (2013.01)

(58) Field of Classification Search
CPC .. H02M 3/158; H02M 1/0074; H02M 1/0009; H02M 3/1582; H02M 3/1584
See application file for complete search history.

(56) References Cited

U.S. PATENT DOCUMENTS

| 10,284,092 B1 | 5/2019 | Elsayad et al. |
| 10,651,735 B2 | 5/2020 | Dai |

(Continued)

FOREIGN PATENT DOCUMENTS

| CN | 105406709 A | 3/2016 |
| CN | 105703621 A | 6/2016 |

(Continued)

OTHER PUBLICATIONS

Office Action with search report from the related application, TW Appl. No. 111148332, issued Jan. 10, 2024, 5 pages.

(Continued)

*Primary Examiner* — Rafael O De Leon Domenech
(74) *Attorney, Agent, or Firm* — FisherBroyles, LLP

(57) ABSTRACT

A power converter circuit. In one aspect, the power converter circuit includes a first buck converter coupled in series to a second buck converter at a junction, and a control circuit coupled to each of the first and second buck converters. In another aspect, the control circuit is arranged to sense a voltage at the junction, compare the sensed voltage to a first threshold voltage and in response to the sensed voltage being at a voltage lower than the first threshold voltage, the control circuit operates the first buck converter and disables the second buck converter. In yet another aspect, the control circuit is arranged to compare the sensed voltage to a second threshold voltage and in response to the sensed voltage being at a voltage higher than the second threshold voltage, the control circuit operates the second buck converter and disables the first buck converter.

20 Claims, 2 Drawing Sheets

(56) References Cited

U.S. PATENT DOCUMENTS

| | | |
|---|---|---|
| 10,770,893 B2 | 9/2020 | Lehn et al. |
| 11,469,675 B1 | 10/2022 | Safa |
| 2012/0007431 A1 | 1/2012 | Jang |
| 2013/0094157 A1 | 4/2013 | Giuliano |
| 2016/0026889 A1 | 9/2016 | Deboy |
| 2016/0268898 A1 | 9/2016 | Deboy |
| 2021/0226546 A1 | 7/2021 | Low |
| 2023/0198390 A1* | 6/2023 | Nicholson ............ H02M 3/158 323/284 |

FOREIGN PATENT DOCUMENTS

| | | |
|---|---|---|
| TW | 201644164 A | 12/2016 |
| TW | 202135451 A | 9/2021 |
| WO | 20200171886 A1 | 8/2020 |

OTHER PUBLICATIONS

Notice of Allowance, U.S. Appl. No. 18/066,893, issued Oct. 10, 2024, 10 pages.

German Office Action (including English translation) issued in App. No. DE102022133544 dated Nov. 4, 2024, 9 pages.

\* cited by examiner

PHASE MULTIPLEXED SERIES STACKED DC-DC CONVERTER

CROSS REFERENCE TO RELATED APPLICATIONS

This application claims priority to following commonly-assigned U.S. provisional patent applications: Ser. No. 63/265,823, for "Phase Multiplexed Series Stacked DC-DC Converter" filed on Dec. 21, 2021, and Ser. No. 63/265,611, for "Systems and Methods for Stable Intermediate Node Operation in Series Stacked Phase DC-DC Converters" filed on Dec. 17, 2021, which are hereby incorporated by reference in entirety for all purposes. This application is also related to the following concurrently-filed and commonly-assigned U.S. patent application Ser. No. 18/066,893, entitled "SYSTEMS AND METHODS FOR STABLE INTERMEDIATE NODE OPERATION IN SERIES STACKED PHASE DC-DC CONVERTERS," filed Dec. 15, 2022, which is also hereby incorporated by reference in its entirety for all purposes.

FIELD

The described embodiments relate generally to power converters, and more particularly, the present embodiments relate to phase multiplexed series stacked DC-DC power converter circuits.

BACKGROUND

A wide variety of electronic devices are available for consumers today. Many of these devices have integrated circuits that are powered by regulated low voltage DC power sources. These low voltage power sources are often generated by dedicated power converter circuits that use a higher voltage input from a battery or another power source. In some applications, the dedicated power converter circuit can be one of the largest power dissipating components of the electronic device and can sometimes consume more space than the integrated circuit that it powers. As electronic devices become more sophisticated and more compact, more efficient power converter circuits are called for.

SUMMARY

In some embodiments, a power converter circuit is disclosed. The power converter circuit includes a first buck converter having a first switch having a first gate terminal, a first drain terminal and a first source terminal, and a second switch having a second gate terminal, a second drain terminal and a second source terminal, the first source terminal coupled to the second drain terminal at a first switch node; a second buck converter having a third switch having a third gate terminal, a third drain terminal and a third source terminal, and a fourth switch having a fourth gate terminal, a fourth drain terminal and a fourth source terminal, the third source terminal coupled to the fourth drain terminal at a second switch node, wherein the second buck converter is coupled in series to the first buck converter at a junction such that the third drain terminal is coupled to the second source terminal; an input terminal coupled to the first drain terminal; an output terminal coupled to the first and second switch nodes; and a control circuit coupled to each of the first and second buck converters, wherein the control circuit is arranged to: sense a voltage at the junction; compare the sensed voltage to a first threshold voltage and in response to the sensed voltage at a voltage lower than the first threshold voltage, the control circuit operates the first buck converter and disables the second buck converter; and compare the sensed voltage to a second threshold voltage and in response to the sensed voltage at a voltage higher than the second threshold voltage, the control circuit operates the second buck converter and disables the first buck converter.

In some embodiments, the first and second buck converters are arranged to generate an output voltage at the output terminal that is lower that an input voltage at the input terminal.

In some embodiments, the first and second buck converters are arranged to control power transfer from the input terminal to the output terminal.

In some embodiments, the control circuit includes a window comparator that includes a first comparator and a second comparator.

In some embodiments, the first comparator is arranged to receive the voltage at the junction and to receive the first threshold voltage.

In some embodiments, the second comparator is arranged to receive the voltage at the junction and to receive the second threshold voltage.

In some embodiments, the output terminal is coupled to the first switch node through a first inductor.

In some embodiments, the output terminal is coupled to the second switch node through a second inductor.

In some embodiments, the first inductor is coupled to the first switch node through a first capacitor.

In some embodiments, a second capacitor is coupled to the junction at its first terminal and to a ground at its second terminal.

In some embodiments, a method of operating a power converter circuit is disclosed. The method includes providing a first buck converter including a first switch having a first gate terminal, a first drain terminal and a first source terminal, and a second switch having a second gate terminal, a second drain terminal and a second source terminal, the first source terminal coupled to the second drain terminal at a first switch node; providing a second buck converter including a third switch having a third gate terminal, a third drain terminal and a third source terminal, and a fourth switch having a fourth gate terminal, a fourth drain terminal and a fourth source terminal, the third source terminal coupled to the fourth drain terminal at a second switch node, wherein the second buck converter is coupled in series to the first buck converter at a junction such that the third drain terminal is coupled to the second source terminal; providing an input terminal coupled to the first drain terminal; providing an output terminal coupled to the first and second switch nodes; and providing a control circuit coupled to each of the first and second buck converters; sensing, by the control circuit, a voltage at the junction; comparing, by the control circuit, the sensed voltage to a first threshold voltage; operating, by the control circuit, the first buck converter and disabling the second buck converter in response to the sensed voltage being at a voltage lower than the first threshold voltage; comparing, by the control circuit, the sensed voltage to a second threshold voltage; and operating, by the control circuit, the second buck converter and disabling the first buck converter in response to the sensed voltage being at a voltage higher than the second threshold voltage.

In some embodiments, the method further includes generating, by the first and second buck converters, an output voltage at the output terminal that is lower that an input voltage at the input terminal.

In some embodiments, the method further includes controlling power transfer, by the first and second buck converters, from the input terminal to the output terminal.

In some embodiments, a circuit is disclosed. The circuit includes a first buck converter having a first switch node; a second buck converter having a second switch node and coupled in series to the first buck converter at a junction; an input terminal coupled to first buck converter; an output terminal coupled to the first and second switch nodes; and a control circuit coupled to each of the first and second buck converters, wherein the control circuit is arranged to: sense a voltage at the junction; compare the sensed voltage to a first threshold voltage and in response to the sensed voltage at a voltage lower than the first threshold voltage, the control circuit operates the first buck converter and disables the second buck converter; and compare the sensed voltage to a second threshold voltage and in response to the sensed voltage at a voltage higher than the second threshold voltage, the control circuit operates the second buck converter and disables the first buck converter.

DETAILED DESCRIPTION

Figure 1:
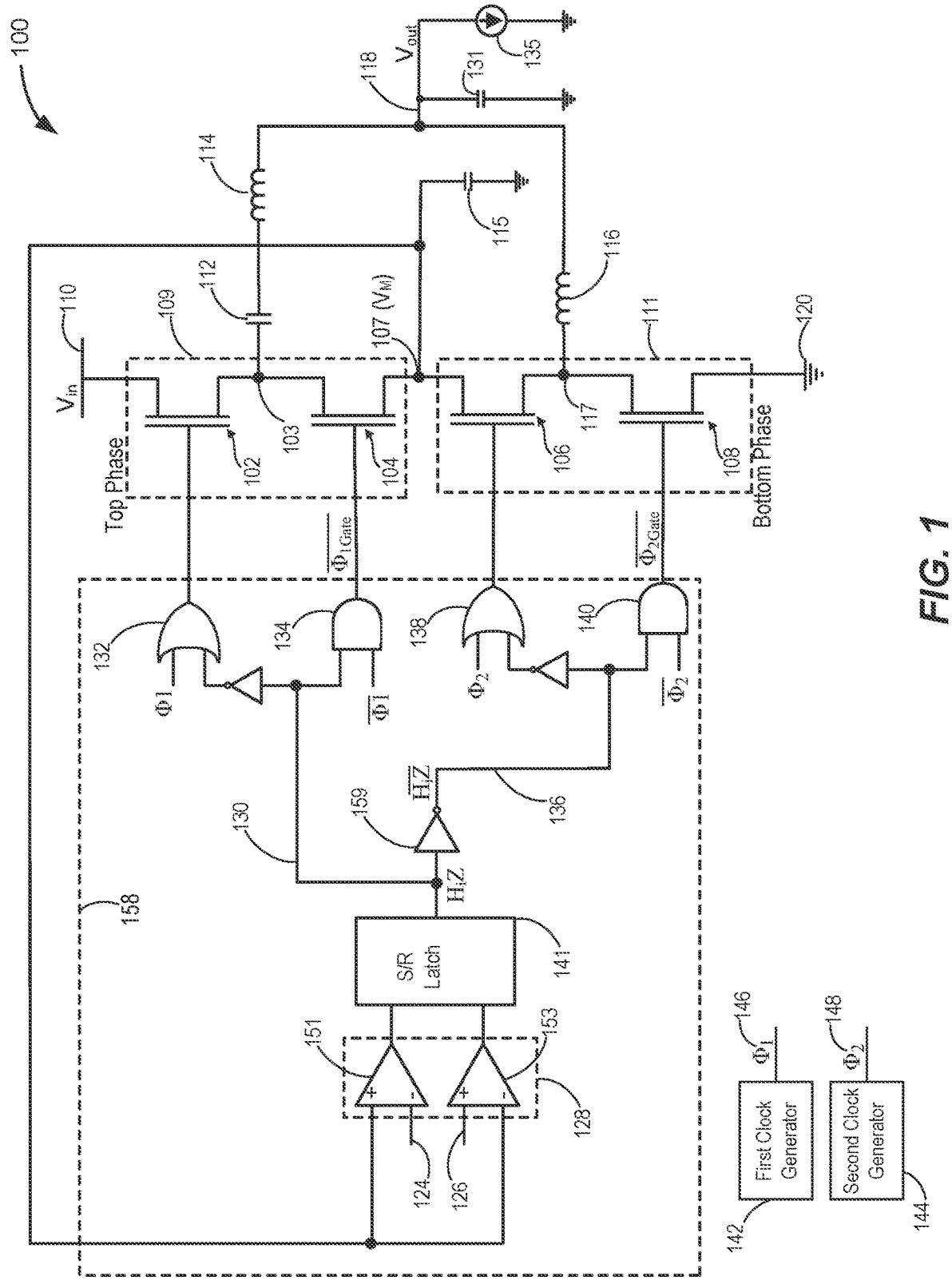
FIG. 1 illustrates a phase multiplexed series stacked DC-DC power converter circuit according to an embodiment of the disclosure.

Circuits and related techniques disclosed herein relate generally to power converters. More specifically, circuits, devices and related techniques disclosed herein relate to phase multiplexed series stacked direct-current to direct-current (DC-DC) power converters. In some embodiments, the phase multiplexed series stacked DC-DC power converter can include a top-phase buck converter and a bottom-phase buck converter. During light load conditions or when the power converter operates with relatively high voltage at its input, and there is relatively low nominal output current and there is a fixed switching frequency such as battery powered IoT applications, the top-phase and bottom-phase can be turned on and off alternatively so that only one phase is running at a time. Further, a voltage at a node where the top-phase connects to the bottom-phase can be sensed and regulated. This can result in a substantial reduction of voltage fluctuations on the output voltage of the power converter because the voltage fluctuations at the output terminal may be moved to an internal node of the power converter.

Embodiments of the disclosure can allow the phase multiplexed series stacked DC-DC power converter to be operated in burst-mode while substantially reducing output voltage ripple because the output voltage ripple is moved to an internal node of the power converter. Further, the disclosed phase multiplexed series stacked DC-DC power converter may have an improved electromagnetic interference (EMI) spectrum while operating in burst mode. Moreover, embodiments of the disclosure can enable a reduction of inductor losses at low nominal loads. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Current approaches to series stacked DC-DC power converters may have a relatively low efficiency in systems that operate with a relatively high input voltage ($V_{IN}$), have a relatively low nominal output current and also have a fixed switching frequency, such as systems used in battery powered IoT applications. In current approaches, an equivalent series resistance (ESR) of the inductor may rise substantially because an AC ripple current, which may flow in the high-impedance skin of the inductor, is relatively large in comparison to the DC current. Further, current approaches may have undesirable electro-magnetic interference (EMI) spectrum when the power converter is operated in a burst mode.

FIG. 1 illustrates a phase multiplexed series stacked DC-DC power converter circuit 100 according to an embodiment of the disclosure. As shown in FIG. 1, the phase multiplexed series stacked DC-DC power converter circuit 100 can include a top-phase 109 (buck converter stage), and a bottom-phase 111 (buck converter stage). In the illustrated embodiment, the top-phase 109 and the bottom-phase 111 buck converter stages can be arranged in a series stacked configuration. The top-phase 109 can be connected to the bottom-phase 111 at a node 107 having a voltage $V_M$. The top-phase 109 buck converter stage can include a first switch 102 and a second switch 104 that are connected in series. The bottom-phase 111 buck converter stage can include third switch 106 and a fourth switch 108 that are connected in series.

The phase multiplexed series stacked DC-DC power converter circuit 100 can include a flying capacitor 112 that is coupled to a node 103. Node 107 may be connected to a capacitor 115. The phase multiplexed series stacked DC-DC power converter circuit 100 can have an input terminal 110 having a voltage $V_{in}$ and may be coupled to ground 120. The phase multiplexed series stacked DC-DC power converter circuit 100 can provide an output voltage $V_{OUT}$ at an output terminal 118. The output terminal 118 can be coupled to a load capacitor 131 and to a load 135. The output voltage $V_{OUT}$ can be lower than an input voltage $V_{in}$ at the input terminal 110. The phase multiplexed series stacked DC-DC power converter circuit 100 can include a first inductor 114 that is connected between the flying capacitor 112 and the output terminal 118. Circuit 100 can also include a second inductor 116 that is connected between node 117 and the output terminal 118.

The phase multiplexed series stacked DC-DC power converter circuit 100 can also include a first clock generator 142 that generates first clock $\Phi_1$ 146, and a second clock generator 144 that generates second clock $\Phi_2$ 148. Logic and control circuit 158 can be arranged to generate control signals for controlling the top-phase 109 and bottom-phase 111 buck converter stages. In some embodiments the top-phase 109 and bottom-phase 111 buck converter stages can be turned on and off alternatively by the logic and control circuit 158. In various embodiments, the control circuit 158 is arranged to operate the top-phase 109 buck converter and disables bottom-phase 111 buck converter. In one embodiment, the logic and control circuit 158 can include a window comparator 128 and a set-reset (S/R) latch 141. The window comparator 128 can compare the voltage at node 107 ($V_M$) to a preset threshold value and keep the voltage at node 107 ($V_M$) within a preset window, for example, within 100 mV of an ideal value for $V_M$. As appreciated by one of ordinary skill in the art having the benefit of this disclosure, the value of the preset window can be set to any suitable value. In some embodiments, an ideal value for $V_M$ would be Vin/2.

The window comparator 128 can include a first comparator 151 and a second comparator 153. The outputs of the first comparator 151 and the second comparator 153 can be coupled to a set/reset latch (S/R latch) 141 and can toggle the S/R latch 141, and alternatively enable the operation of either the top-phase 109 or the bottom-phase 111. The first input of the first comparator 151 can be connected to node 107. The second input 124 of the first comparator 151 can be connected to a first reference voltage that is set to a preset threshold value, for example, a value equal to an ideal value of $V_M$ plus 100 mV. The first input of the second comparator 153 can be connected to node 107. The second input 126 of the second comparator 153 can be connected to a second reference voltage that is set to a preset threshold value, for example, a value equal to an ideal value of $V_M$ minus 100 mV. In this way, node 107 can be kept within a preset window, for example, ±100 mV of the ideal value of $V_M$. When node 107 rises above the preset threshold value, for example above 100 mV, the bottom-phase 111 comes into operation until the voltage $V_M$ at node 107 falls below the preset threshold value, for example below 100 mV, at which time the top-phase 109 comes into operation.

The S/R latch 141 can generate a signal HiZ at it output node 130. Signal HiZ can enable/disable the operation of the top-phase 109. The inverse of signal HiZ can be generated by an inverter 159. The inverse of signal HiZ at node 136 can enable/disable the operation of the bottom-phase 111. The first clock 146 can be applied to the gate of first switch 102 through a first OR gate 132, and the inverse of the first clock 146 can be applied to the gate of second switch 104 through a first AND gate 134. The second clock 148 can be applied to the gate of third switch 106 through a second OR gate 138, and the inverse of the second clock 148 can be applied to the gate of fourth switch 108 through a second AND gate 140. Although one specific control circuit and algorithm are discussed above, one of skill in the art having the benefit of this disclosure will appreciate that other control circuit architectures and control algorithms can be used for the phase multiplexed series stacked DC-DC power converter circuit 100 and are within the scope of this disclosure.

Figure 2:
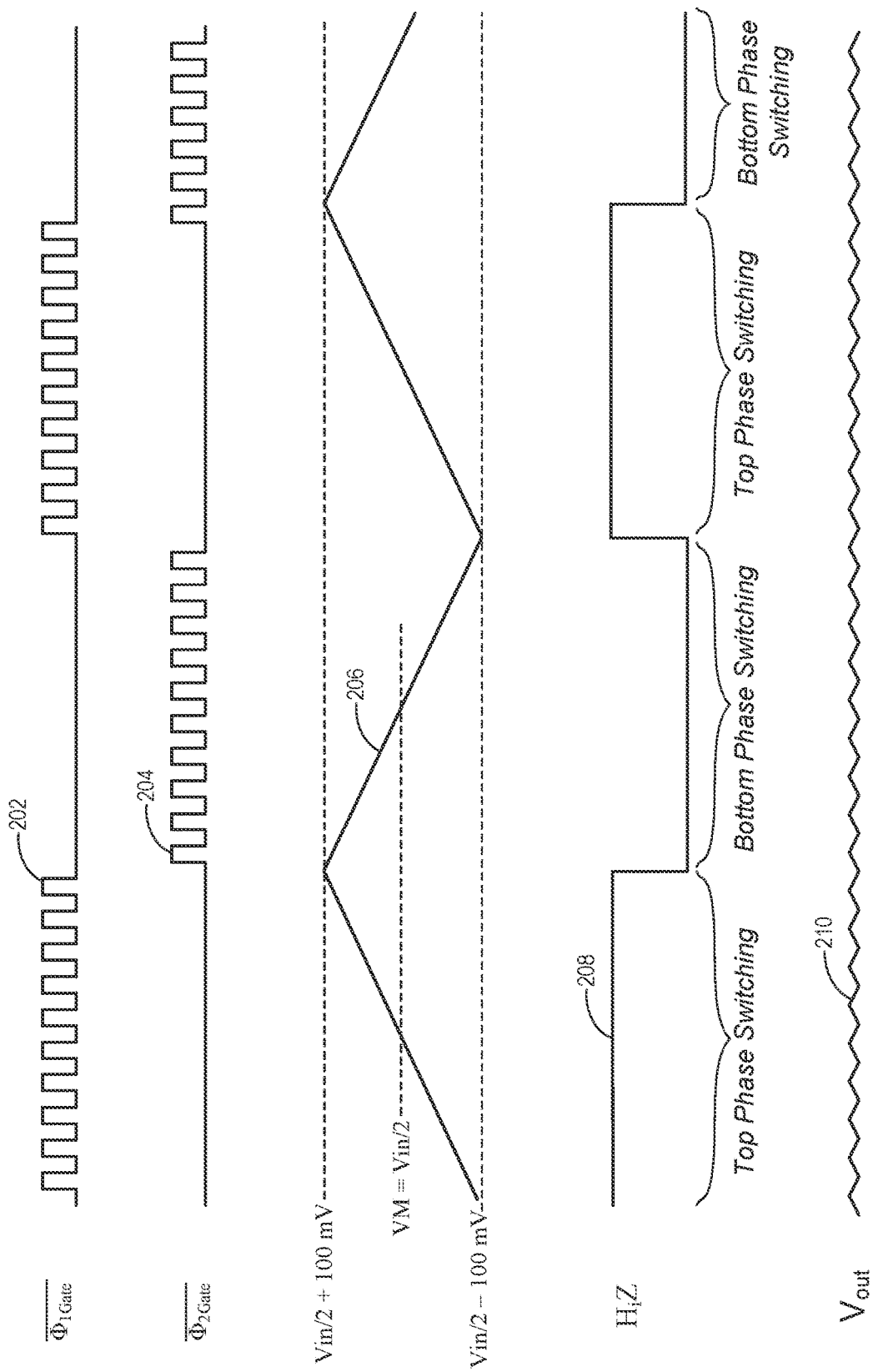
FIG. 2 illustrates a switching sequence and timing diagram for the DC-DC power converter circuit of FIG. 1 according to an embodiment of the disclosure.

Now referring simultaneously to FIGS. 1 and 2, an embodiment of a switching sequence and timing diagrams for circuit 100 are illustrated. FIG. 2 illustrates waveforms for the signal on the gate of the second switch 104 (inverse $\Phi_{1Gate}$), the signal on the gate of the fourth switch 108 (inverse $\Phi_{2Gate}$), the preset threshold window for ($V_M$) node 107 (Vin/2±100 mV), the signal HiZ at node 130 and the output voltage at the output terminal 118. During a first time period, which is referred to as "top-phase switching" period in diagram 208, the signal HiZ is high, thus the top-phase 109 can operate for several cycles as shown in diagram 202 where inverse $\Phi_{1Gate}$ is switching, while the bottom-phase 111 is off as shown in diagram 204 where inverse $\Phi_{2Gate}$ is off. During the "top phase switching" period the voltage at ($V_M$) node 107 increases until it reaches, for example, 100 mV above Vin/2, as shown in diagram 206. Then the window comparator 128 toggles the S/R latch 141. This results in ending the "top phase switching" period and starts a "bottom phase switching" period.

During a second time period, which is referred to as "bottom-phase switching" period in diagram 208, the signal HiZ is low, thus the bottom-phase 111 can operate for several cycles where inverse $\Phi_{2Gate}$ is switching, while the top-phase 109 is off where inverse $\Phi_{1Gate}$ is off. During the "bottom phase switching" period the voltage at ($V_M$) node 107 decreases until it reaches, for example, 100 mV below Vin/2. Then the window comparator 128 toggles the S/R latch 141. This results in ending the "bottom phase switching" period and starts a new "top phase switching" period. As appreciated by one of ordinary skill in the art having the benefit of this disclosure, an acceptable value for voltage fluctuations on ($V_M$) node 107 can be set based on the power converter specifications. The voltage fluctuations on ($V_M$) node 107 can set the number of switching cycles that can be executed in succession for each of the phases. Diagram 210 shows the voltage at the output terminal 118 ($V_{OUT}$). As can be seen in diagram 210, $V_{OUT}$ has relatively small ripple compared to the ripple on node 107 ($V_M$). For example, a value of the ripple on $V_{OUT}$ can be less than few mV. The ripple at the output terminal 118 has a frequency that is equal to the switching frequency of the DC-DC power converter, in contrast to current approaches where the output voltage ripple may have a frequency equal to the burst-mode operation frequency.

The rate of changes of the voltage $V_M$ at node 107 can be set by the capacitor 115, the flying capacitor 112 size and a current through the inductor 114. In various embodiments, a value of the capacitance of the capacitor 115 on node 107 can be increased independently of other power converter operating parameters. As appreciated by one of ordinary skill in the art having the benefit of this disclosure, other feedback loops based on voltages and/or currents at other nodes within the phase multiplexed series stacked DC-DC power converter circuit 100 can be utilized for phase multiplexing. Further, open-loop operations can be utilized to achieve phase multiplexing in series stacked DC-DC converters. It will be understood by one of ordinary skill in the art that there can be alternative methods of controlling the switches in circuit 100 in order to phase multiplex the switches in such a way as to achieve overall loop control, and such methods are within the scope of this disclosure. It will be further understood by one of ordinary skill in the art that alternate methods of controlling the switches in circuit 100 can be utilized in order to optimize light load efficiency, or to minimize area, and/or to minimize electromagnetic interference (EMI), and such methods are within the scope of this disclosure.

Although phase multiplexed series stacked DC-DC power converter circuits are described and illustrated herein with respect to one particular configuration of phase multiplexed series stacked DC-DC power converter circuits, embodiments of the disclosure may be suitable for use with other configurations of DC-DC power converters.

In some embodiments, the described switches can be formed in silicon, or any other suitable semiconductor material. In various embodiments, the described switches can be transistors. In some embodiments, the described switches can be metal oxide semiconductor field effect transistors (MOSFETs). In various embodiments, the disclosed MOSFETS can all be formed within one single die well. In some embodiments, the disclosed phase multiplexed series stacked DC-DC power converter circuits (including the transistors and the control circuitry) can be monolithically integrated onto a single die. In various embodiments, top-phase and bottom-phase stages can be formed on separate individual die. In some embodiments, top-phase, bottom-phase and the logic and control circuits and any combination of them can be formed in groups on separate die, for example, top-phase and bottom-phase can be formed on a single die and the logic and control circuits may be formed on a separate die, or top-phase and bottom-phase can be formed on the same die as the logic and control circuits. In various embodiments, top-phase, bottom-phase and the logic and control circuits can all be integrated into one electronic package, for example, but not limited to, into a quad-flat no-lead (QFN) package, or into a dual-flat no-leads (DFN) package, into a ball grid array (BGA) package. In some embodiments, top-phase and bottom-phase can be individually packaged into an electronic package. In various embodiments, controller circuits and/or control logic circuits can be integrated into a single die along with the disclosed phase multiplexed series stacked phase DC-DC converter.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A power converter circuit comprising:
   a first buck converter including a first switch having a first gate terminal, a first drain terminal and a first source terminal, and a second switch having a second gate terminal, a second drain terminal and a second source terminal, the first source terminal coupled to the second drain terminal at a first switch node;
   a second buck converter including a third switch having a third gate terminal, a third drain terminal and a third source terminal, and a fourth switch having a fourth gate terminal, a fourth drain terminal and a fourth source terminal, the third source terminal coupled to the fourth drain terminal at a second switch node, wherein the second buck converter is coupled in series to the first buck converter at a junction such that the third drain terminal is coupled to the second source terminal;
   an input terminal coupled to the first drain terminal;
   an output terminal coupled to the first and second switch nodes; and
   a control circuit coupled to each of the first and second buck converters, wherein the control circuit is arranged to alternatively enable and disable operation of the first and second buck converters such that only the first or the second buck converter is running at a time.

2. The power converter circuit of claim 1, wherein the first and second buck converters are arranged to generate an output voltage at the output terminal that is lower than an input voltage at the input terminal.

3. The power converter circuit of claim 1, wherein the first and second buck converters are arranged to control power transfer from the input terminal to the output terminal.

4. The power converter circuit of claim 1, wherein the control circuit comprises a window comparator that includes a first comparator and a second comparator.

5. The power converter circuit of claim 4, wherein the first comparator is arranged to receive a voltage at the junction and to receive a first threshold voltage.

6. The power converter circuit of claim 5, wherein the second comparator is arranged to receive the voltage at the junction and to receive a second threshold voltage.

7. The power converter circuit of claim 5, wherein the output terminal is coupled to the first switch node through a first inductor.

8. The power converter circuit of claim 5, wherein the output terminal is coupled to the second switch node through a second inductor.

9. The power converter circuit of claim 7, wherein the first inductor is coupled to the first switch node through a first capacitor.

10. The power converter circuit of claim 9, wherein a second capacitor is coupled to the junction at its first terminal and to a ground at its second terminal.

11. A method of operating a power converter circuit, the method including:
providing a first buck converter including a first switch having a first gate terminal, a first drain terminal and a first source terminal, and a second switch having a second gate terminal, a second drain terminal and a second source terminal, the first source terminal coupled to the second drain terminal at a first switch node;
providing a second buck converter including a third switch having a third gate terminal, a third drain terminal and a third source terminal, and a fourth switch having a fourth gate terminal, a fourth drain terminal and a fourth source terminal, the third source terminal coupled to the fourth drain terminal at a second switch node, wherein the second buck converter is coupled in series to the first buck converter at a junction such that the third drain terminal is coupled to the second source terminal;
providing an input terminal coupled to the first drain terminal;
providing an output terminal coupled to the first and second switch nodes; and
providing a control circuit coupled to each of the first and second buck converters; and
alternatively enabling and disabling operation of the first and second buck converters such that only one of the first or second buck converters is running at a time.

12. The method of claim 11, further comprising generating, by the first and second buck converters, an output voltage at the output terminal that is lower that an input voltage at the input terminal.

13. The method of claim 11, further comprising controlling power transfer, by the first and second buck converters, from the input terminal to the output terminal.

14. The method of claim 11, wherein the control circuit comprises a window comparator that includes a first comparator and a second comparator.

15. The method of claim 14, further comprising receiving, by the first comparator, a voltage at the junction and a first threshold voltage.

16. The method of claim 15, further comprising receiving, by the second comparator, the voltage at the junction and a second threshold voltage.

17. A circuit comprising:
a first buck converter having a first switch node;
a second buck converter having a second switch node and coupled in series to the first buck converter at a junction;
an input terminal coupled to first buck converter;
an output terminal coupled to the first and second switch nodes; and
a control circuit coupled to each of the first and second buck converters, wherein the control circuit is arranged to, during light load conditions, alternatively enable and disable operation of the first and second buck converters such that only one of the first or second buck converters is running at a time.

18. The circuit of claim 17, wherein the first and second buck converters are arranged to generate an output voltage at the output terminal that is lower than an input voltage at the input terminal.

19. The circuit of claim 17, wherein the first and second buck converters are arranged to control power transfer from the input terminal to the output terminal.

20. The circuit of claim 17, wherein the control circuit comprises a window comparator that includes a first comparator and a second comparator.

* * * * *